(12) United States Patent
Katsumoto

(10) Patent No.: US 7,657,395 B2
(45) Date of Patent: Feb. 2, 2010

(54) TWO-AXIS ACCELEROMETER FOR DETECTING INCLINATION WITHOUT THE EFFECT OF COMMON ACCELERATION

(75) Inventor: Kenichi Katsumoto, Tokyo (JP)

(73) Assignee: Memsic Inc., Andover, MA (US)

( * ) Notice: Subject to any disclaimer, the term of this patent is extended or adjusted under 35 U.S.C. 154(b) by 0 days.

(21) Appl. No.: 12/217,559

(22) Filed: Jul. 7, 2008

(65) Prior Publication Data

US 2010/0004893 A1    Jan. 7, 2010

(51) Int. Cl.
*G01P 15/00* (2006.01)
(52) U.S. Cl. .......................... 702/141; 463/37; 701/41; 701/70; 701/209; 702/142
(58) Field of Classification Search ................. 702/141, 702/142, 148, 150, 151, 154; 701/48, 209, 701/41, 70; 463/37
See application file for complete search history.

(56) References Cited

U.S. PATENT DOCUMENTS

2006/0080033 A1* 4/2006 Komatsu .................... 701/209
2007/0173997 A1* 7/2007 Shiozawa et al. ............. 701/41
2007/0265085 A1* 11/2007 Miyamoto et al. ............ 463/37

* cited by examiner

*Primary Examiner*—John H Le
(74) *Attorney, Agent, or Firm*—Weingarten, Schurgin, Gagnebin & Lebovici LLP

(57) ABSTRACT

A system and device for detecting inclination that eliminates the need to compensate for the acceleration of the vehicle is disclosed. The system includes a multi-axis acceleration sensing device that is fixedly attached to the object such that each sensing axis of the multi-axis acceleration sensing device lies in a common plane with the forward-aft axis of the object and the sensing axes are orthogonal to one another and each sensing axis is oriented 45 degrees from the forward-aft axis.

13 Claims, 2 Drawing Sheets

TWO-AXIS ACCELEROMETER FOR DETECTING INCLINATION WITHOUT THE EFFECT OF COMMON ACCELERATION

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of navigational systems and devices and, more particularly, to navigational systems and devices capable of detecting inclination and changes in inclination of an object in motion without having to compensate for the acceleration of the object.

Presently, on-board, three-dimensional travel navigation systems using, for example, the global positioning system ("GPS"), compensate for vehicle acceleration by using a speed pulse that is generated by a speed-pulse generator to accurately detect inclination of the vehicle.

Recent car makes and models can be digitally wired, e.g., using a CAN bus connection, to provide the speed pulse. Transducers have been used to produce speed pulses in older model vehicles. Another popular system incorporates a magnetized, steel, bias wire in one of the vehicle's tires. A receiver is adapted to count the number of rotations of the tire, generating an electronic speed pulse after a predetermined number of rotations.

It would be desirable to provide a system or a device that does not rely on speed pulses, which is to say that the system or device detects inclination independent of the acceleration of the object.

BRIEF SUMMARY OF THE INVENTION

A system and device for detecting inclination that eliminates the need to compensate for the acceleration of the object is disclosed. The system includes a multi-axis, e.g., two-axis, acceleration sensing device that is fixedly attached to the object such that each sensing axis of the multi-axis acceleration sensing device lies in a common plane with the forward-aft axis of the object. The sensing axes are orthogonal to one another and are oriented 45 degrees from each side of the forward-aft axis.

Also disclosed is a method of determining an inclination associated with an object in motion, which includes sensing the acceleration of the object using a multi-axis acceleration sensing device that is fixedly attached to the object; and calculating the inclination of the object (a) using the equation:

$$\alpha = \sin^{-1}\left(\frac{a_x + a_y}{\sqrt{2}\,g}\right) - 45°.$$

in which g is the acceleration due to gravity, $a_x$ is a sensed acceleration along a first sensing x-axis and $a_y$ is a sensed acceleration along a second sensing y-axis.

Other aspects, features, and advantages of the present invention will be apparent from the Detailed Description that follows.

BRIEF DESCRIPTION OF THE SEVERAL VIEWS OF THE DRAWINGS

The invention will be better understood by reference to the following more detailed description and accompanying drawings where like reference numbers refer to like parts.

DETAILED DESCRIPTION OF THE INVENTION

Figure 1:
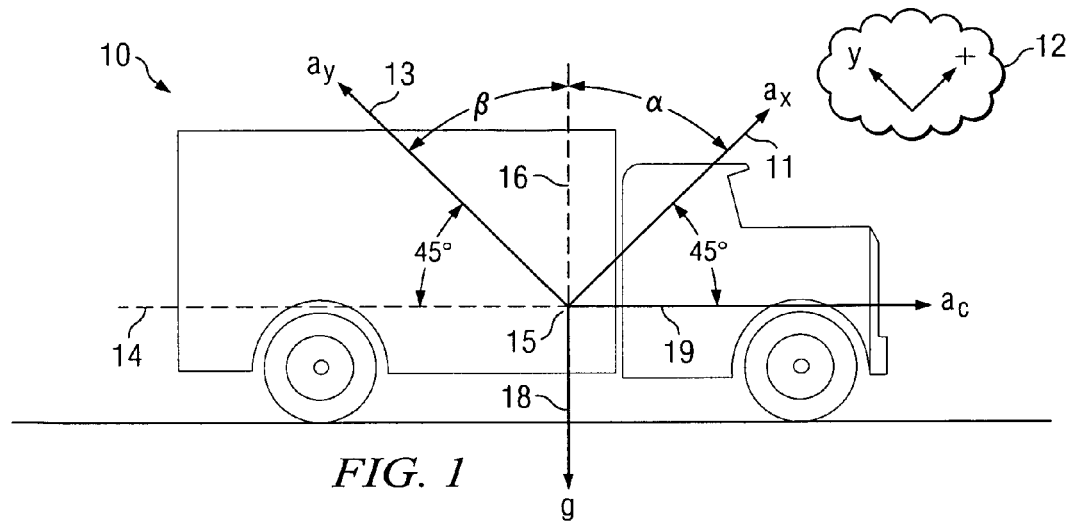
FIG. 1 shows an acceleration diagram, including acceleration sense signals in accordance with the present invention.

FIG. 1 shows an acceleration diagram of an accelerating object 10, e.g., a wheeled-vehicle. The accelerating object 10 is accelerating in a first direction 19 at a rate $a_c$ and is acted upon by the acceleration due to gravity g in a second direction 18. In FIG. 1, the gravity vector 18 is orthogonal or substantially orthogonal to the first direction 19.

According to the present invention, a two-axis accelerometer 15 can be mounted on the accelerating object 10 so that each of the two sensing axes 11 and 13 lie in a common plane (the xy-plane 12) and so that the two sensing axes 11 and 13 are orthogonal to each other. Each of the sensing axes 11 and 13 of the two-axis accelerometer 15 are fixedly positioned to the accelerating object 10 to be 45 degrees from the forward-aft axis 14 of the accelerating object 10, wherein the forward-aft axis 14 of the accelerating object 10 also lies in the same xy-plane 12.

For example, the two-axis accelerometer 15, such as the accelerometers manufactured by MEMSIC, Inc. of Andover, Mass., is a monolithic structure that can be fixedly attached to a daughter printed circuit board (PCB), which, in turn, can be vertically mounted on a main PCB.

As shown in FIG. 1, if another line 16 in the xy-plane 12 extending from the second direction 18 is drawn, a first angle α that is measured between the line 16 and the axis 11 of the sensed acceleration in the x-direction $a_x$ and a second angle β that is measured between the line 16 and the axis 13 of the sensed acceleration in the y-direction $a_y$ are formed.

Figure 2:
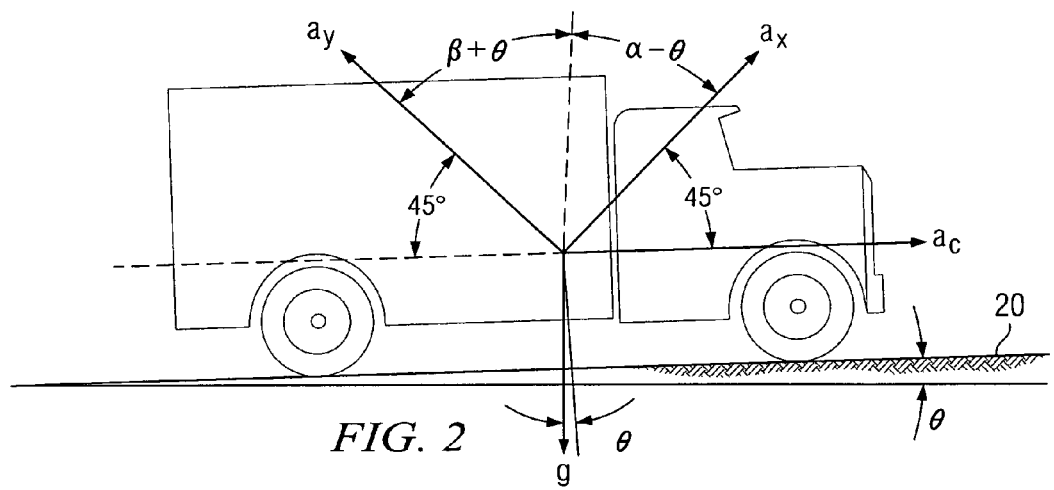
FIG. 2 shows an acceleration diagram for an upwards incline, including acceleration sense signals in accordance with the present invention.

FIG. 2 shows an acceleration diagram of the same accelerating object 10 that is accelerating in a first direction 19 on an upward sloping (positive) incline 20 at a rate $a_c$. If θ is the angle of the incline, the angle between the gravity vector and the first direction 19 is equal to (90°+θ); the first angle α between the line 16 and the axis 11 of the sensed acceleration in the x-direction $a_x$ is equal to (45°−θ); and the second angle β between the line 16 and the axis 13 of the sensed acceleration in the y-direction $a_y$ is equal to (45°+θ).

Figure 3:
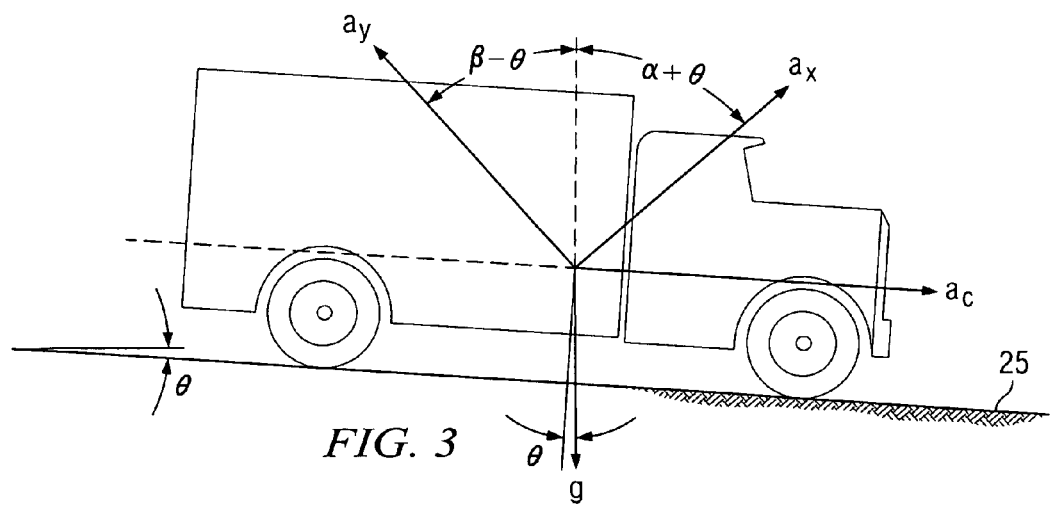
FIG. 3 shows an acceleration diagram for a downwards incline, including acceleration sense signals in accordance with the present invention.

FIG. 3 also shows an acceleration diagram of the same accelerating object 10 that is accelerating in a first direction 19 on a downward sloping (negative) incline 25 at a rate $a_c$. If θ is the angle of the incline, the angle between the gravity vector and the first direction 19 is equal to (90°−θ); the first angle α between the line 16 and the axis 11 of the sensed acceleration in the x-direction $a_x$ is equal to (45°+θ); and the second angle β between the line 16 and the axis 13 of the sensed acceleration in the y-direction $a_y$ is equal to (45°−θ).

Because each of the sensing axes 11 and 13 of the two-axis accelerometer 15 are fixedly positioned to the accelerating object 10 to be 45 degrees from the forward-aft axis 14 of the object 10, the relationship between sensed acceleration in the x-direction $a_x$ and the rate of acceleration $a_c$ of the object 10 and the relationship between sensed acceleration in the y-direction $a_y$ and the rate of acceleration $a_c$ of the object 10 are given by the following identities:

$$\cos 45° = \frac{a_x}{a_c} \rightarrow a_x = a_c * \cos 45° \quad [1]$$

$$\cos 45° = \frac{a_x}{a_c} \rightarrow a_y = a_c * \cos 45°. \quad [2]$$

The relationship between sensed acceleration in the x-direction $a_x$ and the acceleration of gravity g and the relationship between sensed acceleration in the y-direction $a_y$ and the acceleration $a_c$ of gravity are given by the following identities:

$$\cos\alpha = \frac{a_x}{g} \rightarrow a_x = g * \cos\alpha \quad [3]$$

$$\cos\beta = \frac{a_y}{g} \rightarrow a_y = g * \cos\beta. \quad [4]$$

Since β=90°−α, equation [4] also can be expressed as $$\cos\beta = \frac{a_y}{g} \rightarrow a_y = g * \sin\alpha. \quad [5]$$

Summing the accelerations in equations [1] through [4], $$\Sigma(a_x + a_y) = g*\cos\alpha + a_c*\sin 45° + g*\sin\alpha - a_c*\cos 45° \quad [6]$$

which can be reduced to:

$$\Sigma(a_x + a_y) = g*\cos\alpha + g*\sin\alpha \quad [7].$$

Thus, $$a_x + a_y = g(\cos\alpha + \sin\alpha) \quad [8],$$

or $$a_x + a_y = \sqrt{2}g \sin(\alpha + 45°) \quad [9].$$

Solving for the first angle α between the line 16 and the axis 11 of the sensed acceleration in the x-direction $a_x$:

$$\alpha = \sin^{-1}\left(\frac{a_x + a_y}{\sqrt{2}\,g}\right) - 45°. \quad [10]$$

In short, the first angle α between the line 16 and the axis 11 of the sensed acceleration in the x-direction $a_x$ is independent of vehicle acceleration $a_c$ and, hence, use of a speed pulse is unnecessary.

As FIG. 2 and FIG. 3 demonstrate, when the accelerating object 10 is traveling up an incline, the first angle α is greater than β and the sensed acceleration in the x-direction $a_x$ is greater than the sensed acceleration in the y-direction $a_y$. Furthermore, when the accelerating object 10 is traveling down an incline, the first angle α is less than β and the sensed acceleration in the y-direction $a_y$ is greater than the sensed acceleration in the x-direction $a_x$.

To ascertain whether the accelerating object 10 is traveling up or traveling down an incline, after solving for the first angle α using equation [10], instantaneous accelerations $a_1$ and $a_2$ can be determined using the following equations:

$$a_1 = g*\cos\alpha \quad [11] \text{ and}$$

$$a_2 = g*\sin\alpha \quad [12].$$

Figure 4:
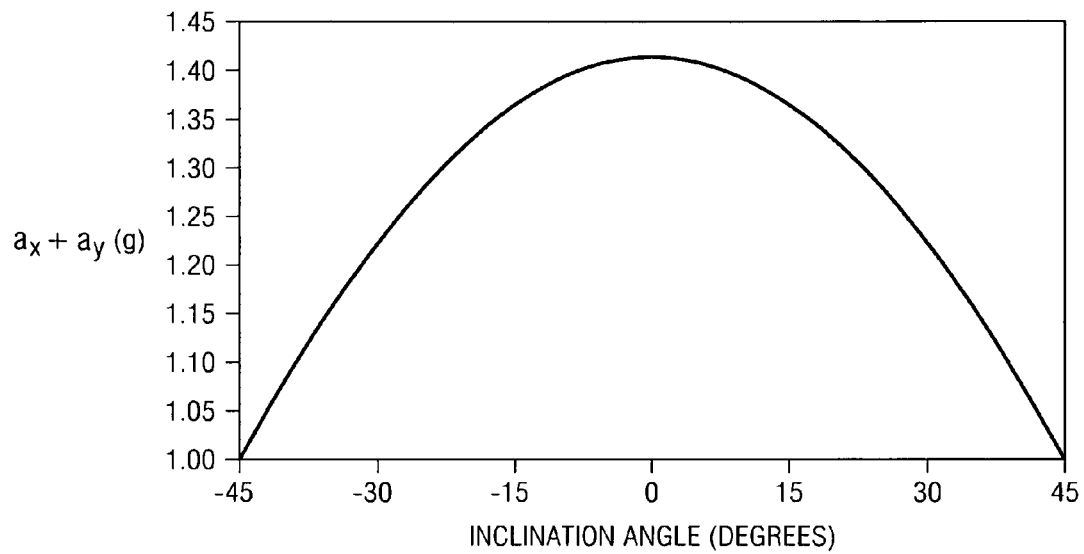
FIG. 4 shows an inclination diagram of a moving object for various inclination angles.

If the difference of $a_x - a_1$ is approximately equal to the difference of $a_y - a_2$ then the accelerating object 10 is traveling up an incline. Alternatively, if the difference of $a_y - a_1$ is approximately equal to the difference of $a_x - a_2$ then the accelerating object 10 is traveling down an incline. FIG. 4 provides a graph of inclination for an accelerating object.

To improve the signal-to-noise ratio (SNR), the signal from the accelerometer can be passed through a low-pass filter, which reduces noise. Additionally or alternatively, SNR can be improved by mounting two accelerometers vertically so that they are oriented in opposite directions, which is to say that one accelerometer is mounted on the forward-aft axis of the accelerating object and the other accelerometer is mounted on the backward-aft axis of the accelerating object. Output from the two accelerometers would provide a signal having twice the magnitude, further diminishing the SNR.

Figure 5:
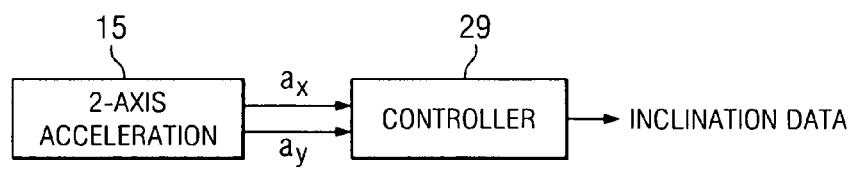
FIG. 5 shows a block diagram of a system for detecting inclination and changes in inclination without having to compensate for the acceleration of the moving object in accordance with the present invention.

Referring to FIG. 5, in order to process acceleration data generated by the two-axis accelerometer 15 and/or to perform the various calculations to determine the inclination angle (θ) and whether the inclination is positive or negative, the system 10 includes at least one controller 29. The controller 29 can include volatile (random access memory), non-volatile memory (read-only memory), and a processor or microprocessor that is adapted to execute hardware- or software-based applications, driver programs, algorithms, and the like that process and store data; that calculate inclination using these data; and that determine whether the inclination is positive or negative. These inclination signal data can be use, for example, in connection with on-board, three-dimensional navigational systems, GPS, and so forth.

Although the invention has been described assuming a two-axis accelerometer in which the two axes are located in the xy-plane, this is not to say that the two axes could not also be oriented in the xz- or the yz-plane. With either of these latter arrangements, a common mode signal based on acceleration and deceleration due to inclination would replace, instead, by a common mode signal in a direction normal to the direction of travel. As a result, signal noise from the road surface can be reduced.

Although the invention has been described using a wheeled-vehicle as the accelerating object, the invention is not to be construed as being limited thereto. For example, the accelerating object could be a tracked-vehicle, sea- or ocean-going vessel, an aircraft, a spacecraft, a satellite, a digital camera, and the like.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

The invention claimed is:

1. A system for detecting inclination of an object in motion, the object having a forward-aft axis, without compensating for any acceleration of the object, the system comprising:

a multi-axis acceleration sensing device that is fixedly attached to the object such that each sensing axis of the multi-axis acceleration sensing device is co-planar with and oriented 45 degrees from the forward-aft axis of the object and the co-planar sensing axes are orthogonal to one another; and means for determining the inclination of the object, wherein the inclination of the object (α) is determined using the equation:

$$\alpha = \sin^{-1}\left(\frac{a_x + a_y}{\sqrt{2}\,g}\right) - 45°,$$

in which g is the acceleration due to gravity, $a_x$ is a sensed acceleration along a first sensing, x-axis and $a_y$ is a sensed acceleration along a second sensing, y-axis.

2. The system as recited in claim 1 further comprising means for determining whether the inclination is an upward slope or a downward slope.

3. The system as recited in claim 2, wherein said means for determining whether the inclination is an upward slope or a downward slope includes:

means for calculating instantaneous accelerations $a_1$ and $a_2$ using the following equations:

$a_1 = g^*\cos \alpha$ and $a_2 = g^*\sin \alpha$ and means for comparing whether the difference between a sensed acceleration along a first sensing, x-axis ($a_x$) and a first instantaneous acceleration ($a_1$) ($a_x - a_1$) is approximately equal to the difference between a sensed acceleration along a second sensing, y-axis ($a_y$) and a second instantaneous acceleration ($a_2$) ($a_y - a_2$) or whether the difference between the sensed acceleration along the second sensing, y-axis and the first instantaneous acceleration ($a_y - a_1$) is approximately equal to the difference between the sensed acceleration along the first sensing, x-axis and the second instantaneous acceleration ($a_x - a_2$); wherein if ($a_x - a_1$) is approximately equal to ($a_y - a_2$), the object is traveling up an incline, but if ($a_y - a_1$) is approximately equal to ($a_x - a_2$), the object is traveling down an incline.

4. The system as recited in claim 1 further comprising a second multi-axis acceleration sensing device that is fixedly attached to the object such that each sensing axis of the second multi-axis acceleration sensing device is co-planar with a backward-aft axis of the object.

5. The system as recited in claim 1, wherein the object in motion is selected from the group consisting of a wheeled-vehicle, a tracked-vehicle, a seagoing vessel, an ocean-going vessel, an aircraft, a spacecraft, a satellite or a digital camera.

6. The system as recited in claim 1, wherein the means for determining the inclination of the object includes a controller having a processor that is adapted to execute at least one of hardware-based or software-based applications, driver programs, and algorithms, which are determine said inclination.

7. A method of determining an inclination associated with an object in motion, the object having a forward aft axis, the method comprising:

sensing acceleration of the object using a multi-axis acceleration sensing device that is fixedly attached to the object such that each sensing axis of the multi-axis acceleration sensing device lies is coplanar with and oriented 45 degrees from the forward-aft axis of the object and the coplanar sensing axes are orthogonal to one another; and calculating the inclination of the object (α) using the equation:

$$\alpha = \sin^{-1}\left(\frac{a_x + a_y}{\sqrt{2}\,g}\right) - 45°,$$

in which g is the acceleration due to gravity, $a_x$ is a sensed acceleration along a first sensing, x-axis and $a_y$ is a sensed acceleration along a second sensing, y-axis.

8. The method as recited in claim 7 further comprising determining whether the inclination is an upward slope or a downward slope by calculating instantaneous accelerations $a_1$ and $a_2$ using the following equations:

$a_1 = g^*\cos \alpha$ and $a_2 = g^*\sin \alpha$; and comparing the difference between a sensed acceleration along a first sensing, x-axis ($a_x$) and a first instantaneous acceleration ($a_1$) ($a_x - a_1$) with the difference between a sensed acceleration along a second sensing, y-axis ($a_y$) and a second instantaneous acceleration ($a_2$) ($a_y - a_2$); and comparing the difference between the sensed acceleration along the second sensing, y-axis and the first instantaneous acceleration ($a_y - a_1$) with the difference between the sensed acceleration along the first sensing, x-axis and the second instantaneous acceleration ($a_x - a_2$); wherein if ($a_x - a_1$) is approximately equal to ($a_y - a_2$), the object is traveling up an incline, but if ($a_y - a_1$) is approximately equal to ($a_x - a_2$), the object is traveling down an incline.

9. A system for detecting inclination of an object in motion, the object having a forward-aft axis, without compensating for any acceleration of the object, the system comprising:

a multi-axis acceleration sensing device that is fixedly attached to the object such that each sensing axis of the multi axis acceleration sensing device is coplanar with and oriented 45 degrees from the forward-aft axis of the object and the co-planar sensing axes are orthogonal to one another; and means for determining the inclination of the object, wherein the inclination of the object (α) is determined using the equation:

$$\alpha = \sin^{-1}\left(\frac{a_x + a_y}{\sqrt{2}\,g}\right) - 45°,$$

in which g is the acceleration due to gravity, $a_x$ is a sensed acceleration along a first sensing, x-axis and $a_y$ is a sensed acceleration along a second sensing, y-axis.

10. The system as recited in claim 9 further comprising means for determining whether the inclination is an upward slope or a downward slope.

11. The system as recited in claim 10, wherein said means for determining whether the inclination is an upward slope or a downward slope includes:

means for calculating instantaneous accelerations $a_1$ and $a_2$ using the following equations:

$$a_1 = g * \cos \alpha \text{ and}$$

$$a_2 = g * \sin \alpha$$

and means for comparing whether the difference between a sensed acceleration along a first sensing, x-axis ($a_x$) and a first instantaneous acceleration ($a_1$) ($a_x - a_1$) is approximately equal to the difference between a sensed acceleration along a second sensing, y-axis ($a_y$) and a second instantaneous acceleration ($a_2$) ($a_y - a_2$) or whether the difference between the sensed acceleration along the second sensing, y-axis and the first instantaneous acceleration ($a_y - a_1$) is approximately equal to the difference between the sensed acceleration along the first sensing, x-axis and the second instantaneous acceleration ($a_x - a_2$); wherein if ($a_x - a_1$) is approximately equal to ($a_y - a_2$), the object is traveling up an incline, but if ($a_y - a_1$) is approximately equal to ($a_x - a_2$), the object is traveling down an incline.

12. The system as recited in claim 9 further comprising a second multi-axis acceleration sensing device that is fixedly attached to the object such that each sensing axis of the second multi-axis acceleration sensing device is coplanar with a backward-aft axis of the object.

13. The system as recited in claim 9, wherein the means for determining the inclination of the object includes a controller having a processor that is adapted to execute at least one of hardware-based or software-based applications, driver programs, and algorithms, which determine said inclination.

* * * * *

UNITED STATES PATENT AND TRADEMARK OFFICE
CERTIFICATE OF CORRECTION

| | |
|---|---|
| PATENT NO. | : 7,657,395 B2 |
| APPLICATION NO. | : 12/217559 |
| DATED | : February 2, 2010 |
| INVENTOR(S) | : Kenichi Katsumoto |

It is certified that error appears in the above-identified patent and that said Letters Patent is hereby corrected as shown below:

In the Specification

Column 1, line 55, "(a)" should read -- ($\alpha$) --.

Signed and Sealed this
Twenty-ninth Day of December, 2015

Michelle K. Lee
*Director of the United States Patent and Trademark Office*